(12) United States Patent
Sanchez Rola et al.

(10) Patent No.: US 11,949,679 B1
(45) Date of Patent: Apr. 2, 2024

(54) DISTINGUISHING BETWEEN FUNCTIONAL TRACKING DOMAINS AND NONFUNCTIONAL TRACKING DOMAINS ON A HOST WEB PAGE

(71) Applicant: NortonLifeLock Inc., Tempe, AZ (US)

(72) Inventors: Iskander Sanchez Rola, Antibes (FR); Johann Roturier, Maynooth (IE); David Luz Silva, Dublin (IE); Leylya Yumer, Antibes (FR); Daniel Marino, Los Angeles, CA (US); Petros Efstathopoulos, Los Angeles, CA (US)

(73) Assignee: GEN DIGITAL INC., Tempe, AZ (US)

( * ) Notice: Subject to any disclaimer, the term of this patent is extended or adjusted under 35 U.S.C. 154(b) by 357 days.

(21) Appl. No.: 17/398,749

(22) Filed: Aug. 10, 2021

(51) Int. Cl.
  *H04L 9/40* (2022.01)
  *G06F 40/14* (2020.01)

(52) U.S. Cl.
  CPC .............. *H04L 63/10* (2013.01); *G06F 40/14* (2020.01)

(58) Field of Classification Search
  CPC .......... H04L 63/10; H04L 63/14; G06F 40/14
  See application file for complete search history.

(56) References Cited

U.S. PATENT DOCUMENTS

| | | | | |
|---|---|---|---|---|
| 8,370,475 B1 * | 2/2013 | Harvey | ................... | H04L 67/02 709/227 |
| 9,197,711 B1 * | 11/2015 | Efstathopoulos | ....... | H04L 63/10 |
| 2012/0209987 A1 * | 8/2012 | Rhinelander | .......... | G06Q 30/02 709/224 |
| 2016/0371507 A1 * | 12/2016 | Jakobsson | ............. | H04L 67/143 |
| 2018/0097761 A1 * | 4/2018 | Everton | ................ | H04L 51/063 |
| 2020/0382533 A1 * | 12/2020 | Nabeel | .................. | H04L 43/045 |
| 2022/0303289 A1 * | 9/2022 | Townsend | ........... | H04L 63/1483 |

OTHER PUBLICATIONS

Detecting and Defending Against {Third-Party} Tracking on the Web, by Roesner et al.; published 2012 (Year: 2012).*
Missed by filter lists: Detecting unknown third-party trackers with invisible pixels, by Legout et al., published 2018 (Year: 2018).*
NortonLifeLock; "Norton Safe Web feature: Link Guard"; Webpage; located at: https://ie.norton.com/feature/safe-web#linkguard; accessed on Aug. 9, 2021; 2 pages.

(Continued)

*Primary Examiner* — Vu V Tran
(74) *Attorney, Agent, or Firm* — MASCHOFF BRENNAN

(57) ABSTRACT

Distinguishing between functional tracking domains and nonfunctional tracking domains on a host web page. In particular, a list of known tracking domains that load content into host web pages may be received. This list of tracking domains may include tracking domains that are functional and tracking domains that are nonfunctional. The tracking domains that are functional may be determined by evaluating various behaviors and characteristics of the tracking domains. Once functional tracking domains have been determined, these functional tracking domains may be allowed, and other tracking domains may be blocked from loading content onto host web pages thereby preserving the functionality of the web pages.

20 Claims, 4 Drawing Sheets

(56) References Cited

OTHER PUBLICATIONS

Kameleo; "Avoid Browser Fingerprinting and Use Virtual Profiles"; Webpage; located at: https://www.producthunt.com/posts/kameleo; accessed on Aug. 9, 2021; 3 pages.
Google Safe Browsing > Safe Browsing AP's (v4); "URLs and Hashing"; Webpage; located at: https://developers.google.com/safe-browsing/v4/urls-hashing; accessed on Aug. 9, 2021; 4 pages.
Github; "Google/safebrowsing"; Webpage; located at: https://github.com/google/safebrowsing; accessed on Aug. 9, 2021; 2 pages.
Disconnect; "Take Control of Your Privacy"; Webpage; located at: https://disconnect.me/; accessed on Aug. 9, 2021; 4 pages.
DuckDuckGo; "DuckDuckGo Privacy Essentials"; Webpage; located at: https://chrome.google.com/webstore/detail/duckduckgo-privacy-essent/bkdgflcldnnnapblkhphbgpggdiikppg?hl=en; accessed on Aug. 9, 2021; 1 page.
Brave; "Browse 3× faster than Chrome"; Webpage; located at: https://brave.com/; accessed on Aug. 9, 2021; 5 pages.
OneTrust; "OneTrust Privacy—Privacy Management Software"; Webpage; located at: https://www.onetrust.com/solutions/privacy-management/; accessed on Aug. 9, 2021; 4 pages.

* cited by examiner

DISTINGUISHING BETWEEN FUNCTIONAL TRACKING DOMAINS AND NONFUNCTIONAL TRACKING DOMAINS ON A HOST WEB PAGE

BACKGROUND

As the presence of tracking domains on popular web pages has increased, so has the demand for privacy solutions. Many host web pages that are accessible on the Internet today include one or more tracking domains, which can compromise the privacy of any user that happens to visit these web pages or select (e.g., click on or tap on) a link associated with the tracking domain. Tracking domains may appear on host web pages in a wide variety of forms. Some tracking domains load content into banners while other tracking domains load content that is embedded directly within the web page itself.

To avoid tracking domains and their associated privacy violations, tracking domains may be identified and blocked from loading content into host web pages. Privacy policies that take this broad approach and block all known tracking domains are effective in cases where a tracking domain's unique intention is to perform tracking activities. However, in addition to performing tracking activities, some tracking domains also provide functionality to the host web pages on which these tracking domains appear. For example, a functional tracking domain may load content, such as a media reference, into a host web page. By blocking a tracking domain that loads a media reference into a web page, the media reference will cease to function. Therefore, enforcing a privacy policy that blocks all tracking domains may result in broken host web pages.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for distinguishing between functional tracking domains and nonfunctional tracking domains on a host web page may be performed, at least in part, by a computing device comprising one or more processors. The method may include receiving a list of known tracking domains that load content into host web pages, the list of tracking domains including tracking domains that are functional and tracking domains that are nonfunctional, determining which tracking domains on the list are functional, wherein a tracking domain is determined to be functional if at least one of conditions (a)-(f) is true: (a) the tracking domain makes at least 15 requests on at least 50% of host web pages that include content loaded from the tracking domain, (b) the tracking domain hosts at least 10 different scripts on host web pages that include content loaded from the tracking domain, (c) the tracking domain belongs to a domain category that is known to provide web page functionality, (d) a uniform resource locater (URL) of the tracking domain includes words that imply storage of data or hosting capabilities, (e) the tracking domain is listed as essential in at least 50% of host web pages that identify essential domains and that include content loaded from the tracking domain, or (f) the tracking domain is contacted by a widget to provide an on-screen tool to the host web page. The method may further include classifying each tracking domain determined to be functional as a functional tracking domain, classifying each tracking domain not determined to be functional as a nonfunctional tracking domain, allowing the functional tracking domains to load content into the host web pages, and blocking the nonfunctional tracking domains from loading content into the host web pages.

In some embodiments, the functional tracking domain may load a media reference into the host web page. In some embodiments, to determine whether scripts are different, a fuzzy hashing function may be used. In some embodiments, the domain category that is known to provide web page functionality may be financial services, dynamic DNS host, shopping, TV/video streams, social networking, auctions, audio/video clips, newsgroups/forums, chat (IM)/SMS, radio/audio streams, file storage/sharing, or email. In some embodiments, the words that imply storage of data or hosting capabilities include "CDN," "asset," or "content." In some embodiments, the host web pages may identify essential domains in a privacy policy, a cookie policy, or a consent management provider. In some embodiments, the tracking domain may be determined to be functional if at least two of conditions (a)-(f) are true.

Also, in some embodiments, one or more non-transitory computer-readable media may comprise one or more computer-readable instructions that, when executed by one or more processors of a privacy server, cause the privacy server to perform a method for distinguishing between functional tracking domains and nonfunctional tracking domains on a host web page.

Also, in some embodiments, a computing device comprising one or more processors and one or more non-transitory computer-readable media comprising one or more computer-readable instructions that, when executed by the one or more processors, may cause the computing device to perform a method for distinguishing between functional tracking domains and nonfunctional tracking domains on a host web page.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
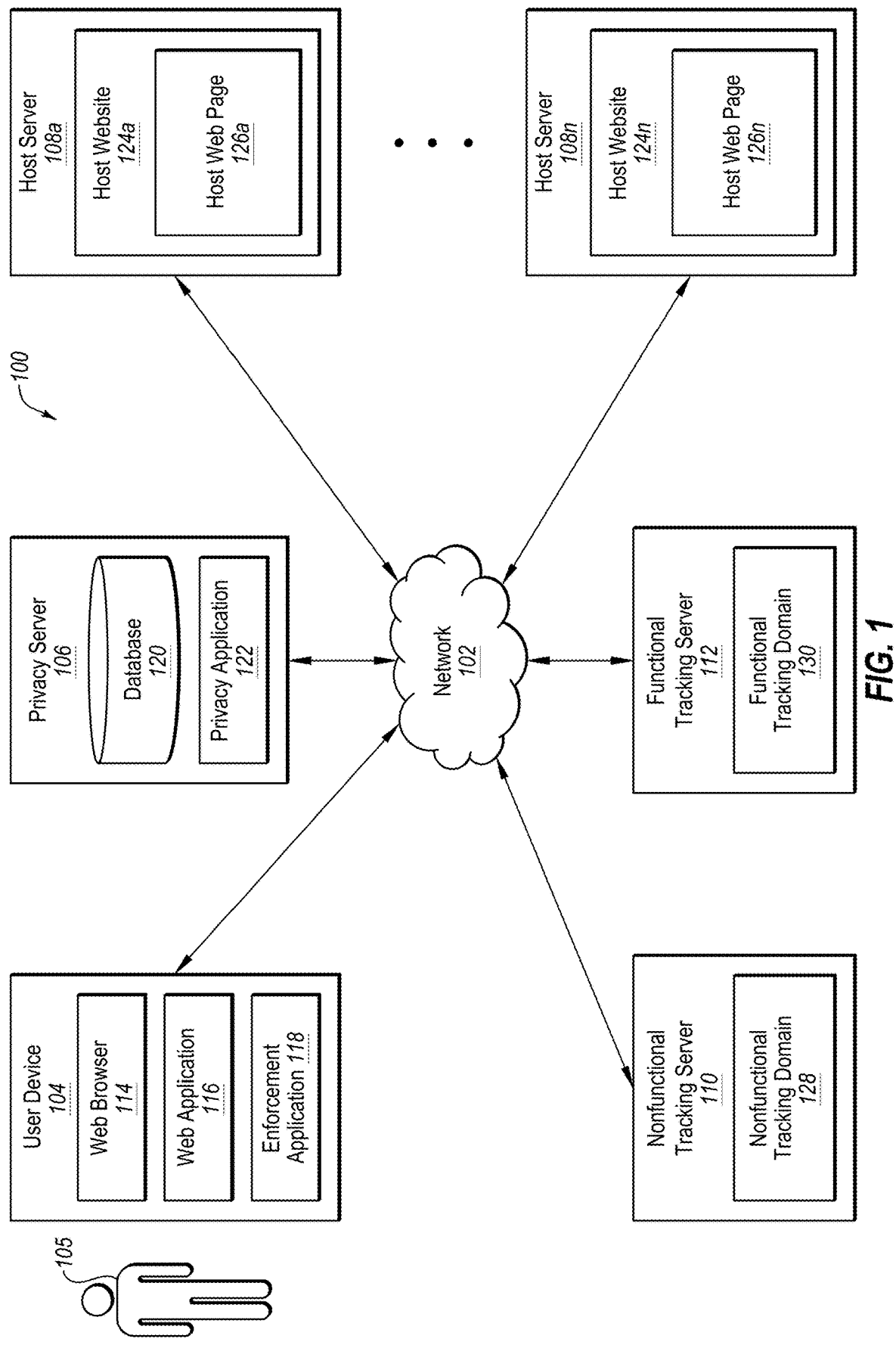
FIG. 1 illustrates an example system configured for distinguishing between functional tracking domains and nonfunctional tracking domains on a host web page.

A large number of web pages host content that is provided by tracking domains. These tracking domains may appear in banners on the host web page, such as advertisements, or these tracking domains may load content that is imbedded directly within the host web page itself. Tracking domains can compromise the privacy of users that visit these host web pages and/or select links associated with the tracking domains, as these tracking domains may allow the users' online movements to be tracked and followed.

To avoid the privacy violations that result from the unauthorized monitoring of online activities and movements, tracking domains may be identified and blocked. By blocking all known tracking domains, users may be protected from these tracking domains and their tracking activities. In addition to protecting user privacy, blocking tracking domains may also enable host web pages to load at a must faster rate, as content that originates from a blocked tracking domain will not be loaded.

Privacy policies that take this broad approach and block all known tracking domains are effective in cases where a tracking domain's unique intention is to perform tracking activities. However, in addition to performing tracking activities, some tracking domains also provide functionality to the host web pages on which these tracking domains appear. For example, a tracking domain that provides some functionality to a host web page (or a "functional tracking domain") may include a content delivery network (DNS) or a domain that stores configuration settings (such as localization, preferences, embedded media references, etc.) in various browser storage application programming interfaces (APIs), so that the host web page works as expected. Therefore, enforcing a policy that blocks all tracking domains may result in broken host web pages.

Some embodiments disclosed herein may enable distinguishing between functional tracking domains and nonfunctional tracking domains on a host web page. In particular, in some embodiments, a list of known tracking domains that load content into host web pages may be received. This list of tracking domains may include tracking domains that are functional and tracking domains that are nonfunctional. A determination of which tracking domains on the list are functional may be made. A tracking domain may be determined to be functional if at least one of conditions (a)-(f) is true: (a) the tracking domain makes at least 15 requests on at least 50% of host web pages that include content loaded from the tracking domain, (b) the tracking domain hosts at least 10 different scripts on host web pages that include content loaded from the tracking domain, (c) the tracking domain belongs to a domain category that is known to provide web page functionality, (d) a uniform resource locater (URL) of the tracking domain includes words that imply storage of data or hosting capabilities, (e) the tracking domain is listed as essential in at least 50% of host web pages that identify essential domains and that include content loaded from the tracking domain, or (f) the tracking domain is contacted by a widget to provide an on-screen tool to the host web page. Once this determination is made, each tracking domain determined to be functional may be classified as a functional tracking domain and each tracking domain not determined to be functional may be classified as a nonfunctional tracking domain. Access to the functional tracking domains on a host web page may be allowed in a web browser and access to the nonfunctional tracking domains on a host web page may be blocked in the web browser.

Turning to the figures, FIG. 1 illustrates an example system 100 configured for distinguishing between functional tracking domains and nonfunctional tracking domains on a host web page. The system 100 may include a network 102, a user device 104 and associated user 105, a privacy server 106, host servers 108a-108n, a nonfunctional tracking server 110, and a functional tracking server 112.

In some embodiments, the network 102 may be configured to communicatively couple the user device 104, the privacy server 106, the host servers 108a-108n, the nonfunctional tracking server 110, and the functional tracking server 112. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
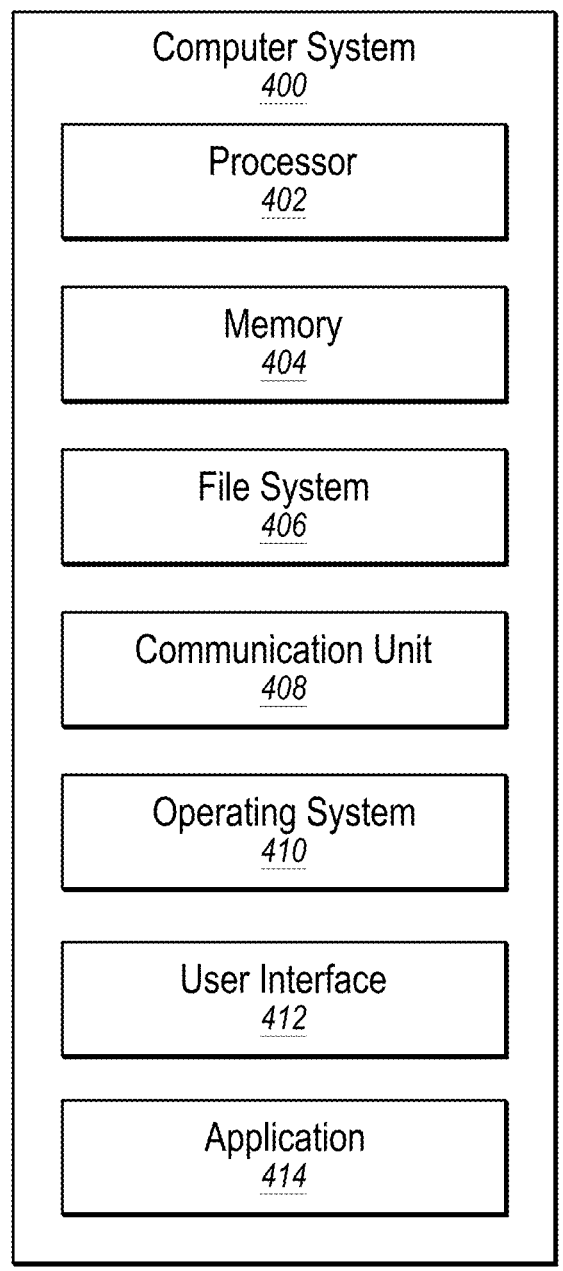
FIG. 4 illustrates an example computer system that may be employed in distinguishing between functional tracking domains and nonfunctional tracking domains on a host web page.

In some embodiments, the user device 104 may be any computer system capable of communicating over the network 102 and vising one or more websites over network 102, examples of which are disclosed herein in connection with the computer system 400 of FIG. 4. In some embodiments, the user device 104 may include a web browser 114. The web browser 114 may enable the user 105 to access third party content, such as websites, over the network 102. In some embodiments, the user device 104 may include one or more web applications 116. Like the web browser 114, the web application 116 may also enable the user 105 to access third party content, such as websites, over the network 102.

In some embodiments, the user device 104 may also include an enforcement application 118. The enforcement application 118 may be configured to block one or more tracking domains from loading content into a host web page that the user 105 visits through the web browser 114 and/or the web application 116. The enforcement application 118 could be configured in a variety of different ways. For example, the enforcement application 118 could be configured as an extension or a plugin or an addon to the web browser 114. The enforcement application 118 could also be configured as an extension or a plugin or an addon to the web application 116. Regardless of how the enforcement application 118 is configured, the enforcement application 118 may interface with the privacy server 106 to determine which tracking domains to block each time the user 105 visits a web page through either the web browser 114 or the web application 116.

In some embodiments, the privacy server 106 may be any computer system capable of communicating over the network 102, examples of which are disclosed herein in connection with the computer system 400 of FIG. 4. In some embodiments, the privacy server 106 may include a database 120. The database 120 may include a list of known tracking domains. The known tracking domains may be identified by performing a large-scale crawling of web pages that are available over the network 102. Web pages analyzed in the large-scale crawling may include a specified number of the most visited websites or web pages on the Internet. For example, the top one million websites and their affiliated web pages on the Internet may be analyzed. Tracking domains that load content onto these web pages may be recognized based on identifier cookie creation and sharing behaviors exhibited by the tracking domains. Alternatively, a list of domains that have been previously identified as tracking domains may be received and stored in the database 120. In addition to the list of known tracking domains, the database 120 may also store an identification of the host web pages on which each of the known tracking domains appear or provide content.

In some embodiments, the privacy server 106 may also include a privacy application 122. The privacy application 122 may analyze each of the tracking domains on the list of known tracking domains to determine which tracking domains provide functionality to the web page(s) on which they appear. This analysis may be entirely automated such that the security application 122 automatically identifies the functional tracking domains without any human review or input. As provided in more detail in FIG. 2, the security application 122 may analyze the tracking domains and the web pages on which they load content to identify certain behaviors and characteristics, and determine, based on these behaviors and characteristics, whether the tracking domains provide web page functionality.

The privacy application 122 may interface with the enforcement application 118 on the user device 104 to allow tracking domains found to provide functionality (or "functional tracking domains") to load content into host web pages that the user 105 accesses through the web browser 114 and/or web application 116. Similarly, the privacy application 122 may interface with the enforcement application 118 on user device 104 to block tracking domains found to not provide functionality (or "nonfunctional tracking domains") from loading content into host web pages that the user 105 accesses through the web browser 114 and/or web application 116.

In some embodiments, the host servers 108a-108n may be any computer systems capable of communicating over the network 102, examples of which are disclosed herein in connection with the computer system 400 of FIG. 4. In some embodiments, host servers 108a-108n may include host websites 124a-124n, which may include one or more host web pages 126a-126n. The host websites 124a-124n and host web pages 126a-126n may be accessed by the user 105 through the web browser 114 and/or the web application 116. The host web pages 126a-126n may include content that is loaded from one or more tracking domains. This content may be loaded in one or more frames or in banners that appear at a top, bottom, or along the sides of the host web pages 126a-126n. Alternatively, the tracking domains may load content into the host web pages 126a-126n by embedding the content directly within the web pages 126a-126n.

In some embodiments, the nonfunctional tracking server 110 may be any computer system capable of communicating over the network 102, examples of which are disclosed herein in connection with the computer system 400 of FIG. 4. In some embodiments, the nonfunctional tracking server 110 may include a nonfunctional tracking domain 128. Nonfunctional tracking server 110 may load content into one or more host web pages, such as web pages 126a-126n, through the nonfunctional tracking domain 128. The nonfunctional tracking domain 128 may not provide any functionality to the host web page(s) on which it loads content.

In some embodiments, the functional tracking server 112 may be any computer system capable of communicating over the network 102, examples of which are disclosed herein in connection with the computer system 400 of FIG. 4. In some embodiments, the functional tracking server 112 may include a functional tracking domain 130. Functional tracking server 112 may load content into one or more host web pages, such as web pages 126a-126n, through the functional tracking domain 130. The functional tracking domain 130 may also provide some functionality to the host web page(s) on which it loads content. For example, the functional tracking domain 130 may be content delivery network (CDN). The functional tracking domain 130 may provide a media reference, such as a video clip or an audio clip, into a host web page. The functional tracking domain 130 may also provide an on-screen tool, such as a site search or chat function to the host web page. The functional tracking domain 130 may also provide TV/video streams or radio/audio streams.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, the database 120 may be external to the privacy server 106 or the privacy application 122 may be within the user device 104.

Figure 2:
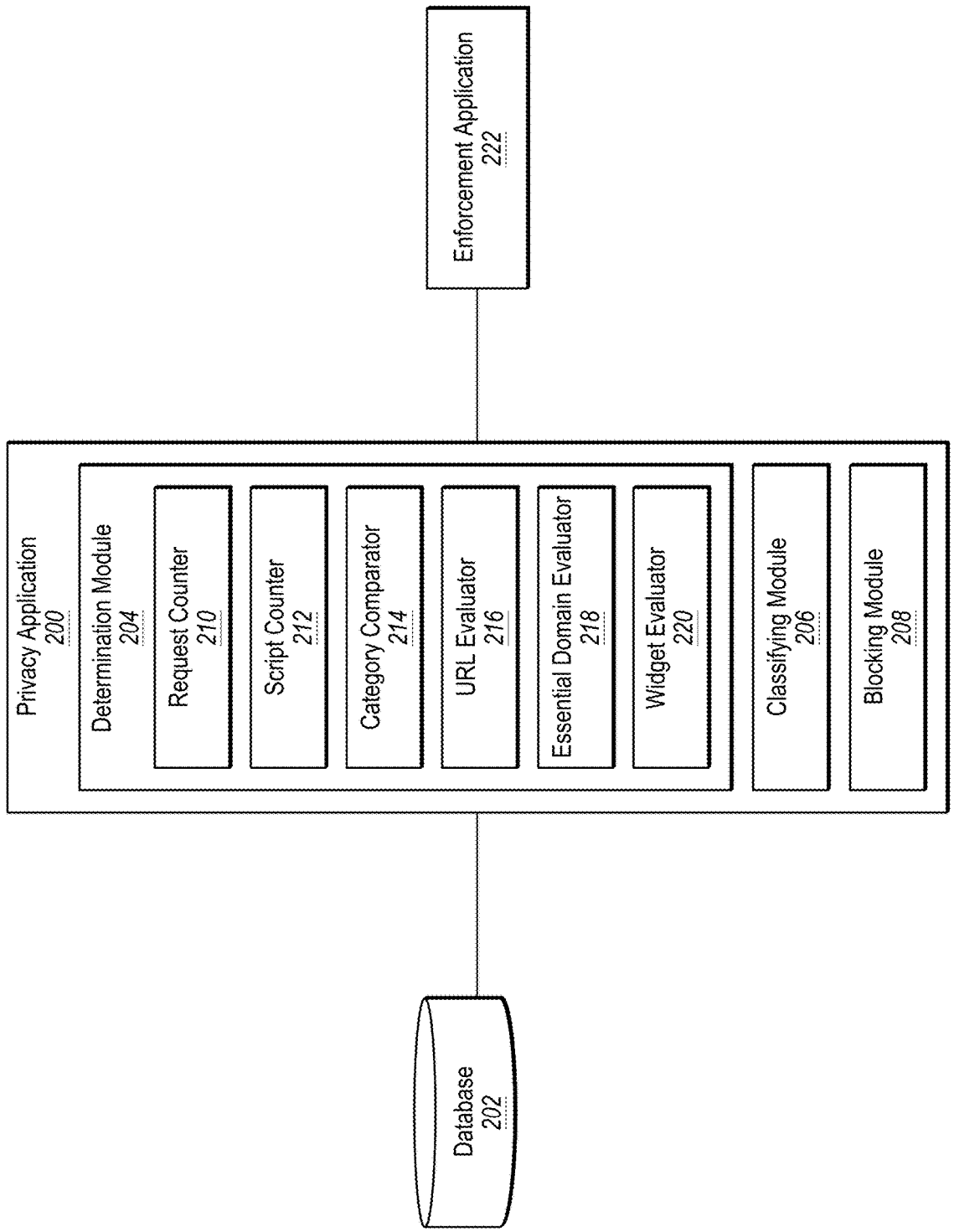
FIG. 2 illustrates an exemplary privacy application.

FIG. 2 illustrates an exemplary privacy application 200. For example, the privacy application 200 may be implemented in the system illustrated in FIG. 1 as the privacy application 122. In one embodiment, the privacy application 200 may receive a list of known tracking domains from a database 202. The database 202 may be implemented in the system illustrated in FIG. 1 as the database 120. The database 202 may store not only a list of known tracking domains but also an identification of the host web pages on which each tracking domain loads content.

The privacy application 200 may determine which tracking domains on the list received from the database 202 provide some functionality to host web pages, classify these tracking domains as either functional or nonfunctional, block the nonfunctional tracking domains, and allow the functional tracking domains. To do this, the privacy application 200 may include a determination module 204, a classifying module 206, and a blocking module 208.

In one embodiment, the determination module 204 may evaluate many different behaviors and characteristics of the known tracking domains and the web pages where they load content to determine whether the tracking domain is functional. In one embodiment, the determination module 204 may include a request counter 210. For each tracking domain included on the list, the request counter 210 may determine a number of requests that the tracking domain makes on each of the host web pages that load content from the tracking domain. In one embodiment, the request counter 210 may specify a threshold number of requests and a threshold percentage of host web pages. For example, the request counter 210 may determine that a tracking domain that makes at least 15 requests on at least 50% of host web pages that include content loaded from the tracking domain indicates that the tracking domain provides some functionality to host web pages.

Any combination of threshold values for the number of requests made and the percentages of host web pages where these requests are made may be used as threshold values to indicate that the tracking domain provides some functionality to host web pages. However, the probability that a tracking domain provides some functionality to host web pages increases as the number of requests increases on a higher percentage of web pages that host content from the tracking domain. For example, a tracking domain that makes at least 30 requests on at least 75% of host web pages that include content loaded from the tracking domain may provide a stronger indication that the tracking domain provides some functionality to host web pages. A tracking domain that makes less than 15 requests on less than 50% of host web pages that include content loaded from the tracking domain may provide a weaker indication (or no indication at all) that the tracking domain provides some functionality to host web pages.

In one embodiment, the determination module 204 may include a script counter 212. For each tracking domain included on the list, the script counter 212 may determine a number of different scripts or script names that the tracking domain hosts on host web pages that load content from the tracking domain. To determine whether scripts or script names are the same or different, the script counter 212 may use a hashing function. For example, the script counter 212 may use a message-digest algorithm (MD5) hash function to produce hash values for each of the scripts or script names used by a tracking domain. These hash values may then be compared to determine whether the scripts or script names are the same or different.

In some embodiments, scripts and script names may be considered the same even if they are not identical, as long as the differences fall within an allowed tolerance. For example, in some embodiments, the script counter 212 may use a fuzzy hashing function, such as ssDeep, to produce hash values for each of the scripts or script names. These hash values may be compared and, if the differences between these hash values fall within an allowed tolerance, the script counter 212 may consider the scripts or script names to be the same. For example, the script counter 212 may consider two scripts the same if their hashes match by more than 90%, or some other designated percentage.

In one embodiment, the script counter 212 may specify a threshold number of different scripts hosted by a tracking domain. For example, a tracking domain that hosts at least 10 different scripts may indicate that the tracking domain provides some functionality to host web pages. Any threshold value for a number of different scripts may be used to indicate that the tracking domain provides some functionality to host web pages. However, the probability that a tracking domain provides some functionality to host web pages increases as the number of different scripts that it hosts increases. For example, a tracking domain that hosts 20 or more different scripts may provide a stronger indication that the tracking domain provides some functionality to host web pages. A tracking domain that hosts 5 or less different scripts may provide a weaker indication (or no indication at all) that the tracking domain provides some functionality to host web pages.

In one embodiment, the determination module 204 may include a category comparator 214. For each tracking domain included on the list, the category comparator 214 may determine a category to which each tracking domain belongs. To determine the category to which a tracking domain belongs, the category comparator 214 may analyze the tracking domain and/or a website that is associated with the tracking domain. The category comparator 214 may then compare the tracking domain category to a list of domain categories that are known to provide some web page functionality. This list of domain categories that are known to provide some web page functionality may also be stored on the database 202. The list of domain categories that are known to provide some web page functionality may include financial services, dynamic DNS host, shopping, TV/video streams, social networking, auctions, audio/video clips, newsgroup/forums, chat (IM)/SMS, radio/audio streams, file storage/sharing, or email, to name a few. A tracking domain that belongs to a domain category that is known to provide some web page functionality may indicate that the tracking domain provides some functionality to host web pages.

In one embodiment, the determination module 204 may include a uniform resource locator (URL) evaluator 216. The URL evaluator 216 may evaluate a URL address associated with each tracking domain included on the list. The URL evaluator 216 may then compare the tracking domain URL address to a list of terms that may indicate that the tracking domain provides some web page functionality. These terms that may indicate that the tracking domain provides some web page functionality may also be stored on database 202. In one embodiment, terms that imply storage of data or hosting capacity may indicate that the tracking domain provides some web page functionality. For example, the terms "CDN" or "asset" may indicate that the tracking domain provides some web page functionality.

In one embodiment, the determination module 204 may include an essential domain evaluator 218. The essential domain evaluator 218 may analyze the host web pages on which each tracking domain appears. The essential domain evaluator 218 may first determine whether the host web page identifies essential domains, and if so, whether the tracking domain is identified as essential to the host web page. Host web pages may identify essential domains in, for example, the host website's privacy policy, cookie policy, or in text that is displayed by a consent management provider (CMP). A web page that identifies a tracking domain as essential may indicate that the tracking domain provides some web page functionality. The more frequently that a tracking domain is identified as essential will strengthen the indication that the tracking domain is functional.

In one embodiment, the essential domain evaluator 218 may specify a threshold percentage of host web pages that identify essential domains and that identify the tracking domain as essential. For example, a tracking domain that is listed as essential in at least 50% of host web pages that identify essential domains and that include content loaded from the tracking domain may indicate that the tracking domain provides some functionality to host web pages. Any threshold value for the percentage of host web pages that identify essential domains and identify the tracking domain as essential may be used as a threshold value to indicate that the tracking domain provides some functionality to host web pages. However, the probability that a tracking domain provides some functionality to host web pages increases as the percentage of host web pages that identify essential domains and identify the tracking domain as essential increases.

For example, a tracking domain that is listed as essential in at least 75% or more of host web pages that identify essential domains and that include content loaded from the tracking domain may provide a stronger indication that the tracking domain provides some functionality to host web pages. A tracking domain that is listed as essential less than 50% of host web pages that identify essential domains and that include content loaded from the tracking domain may provide a weaker indication (or no indication at all) that the tracking domain provides some functionality to host web pages.

In one embodiment, the determination module 204 may include a widget evaluator 220. The widget evaluator 220 may evaluate web widgets that are embedded in host web pages. These web widgets may provide one or more on-screen tools to host web pages. For example, a web widget may provide a search function, a chat function, a clock, a daily weather report, or a counter of visits to a web page, to name a few. Some web widgets contact external domains to provide the functionality enabled by the web widget. For example, a tracking domain may be contacted to provide an internal site search or chat functionality to a host web page. To identify the tracking domains that provide the functionality enabled by these web widgets, the widget evaluator 220 may test the functionality of the web widget to confirm that it operates as a user would expect. For example, with regard to a web widget that provides an internal search functionality, the widget evaluator 220 may enter specific query parameters (such as "q" or "query") with a dummy query string (or parts of it) as the value. The widget evaluator 220 may determine whether URL parameter values contain substrings of "DUMMYSTRING", such as q=D or q=DU. If the URL parameter values contain these substrings, the functionality provided by the tracking domain may be confirmed.

Once the determination module has conducted its analysis and determined which tracking domains on the list are functional, the classifying module 206 may classify each tracking domain within the list as either functional or nonfunctional. In some embodiments, tracking domains that the determination module determines to be functional may be classified as "functional tracking domains." All other tracking domains on the list may be classified as "nonfunctional tracking domains."

Once the classifying module 206 has classified each tracking domain in the list as either a functional tracking domain or a nonfunctional tracking domain, the blocking module 208 may provide instructions to allow access to the functional tracking domains, and block access to the nonfunctional tracking domains.

In some embodiments, the blocking module 208 may interface with an enforcement application 222 to enforce the instructions provided by the blocking module 208. In some embodiments, the enforcement application 222 may be installed on a user device, such as enforcement application 118 on user device 104 in FIG. 1. The enforcement application 222 may be configured as an extension or a plugin or an addon to a web browser or web application(s) on the user device. Regardless of how the enforcement application 222 is configured, it may interface with the privacy application 200 to determine which tracking domains to block and which tracking domains to allow each time a user visits a web page through either a browser or a web application.

By distinguishing between functional tracking domains and nonfunctional tracking domains, tracking domains that do not provide any web page functionality may be blocked, thereby protecting a user's privacy from tracking activities that would be performed by these domains if not blocked. At the same time, tracking domains that provide some web page functionality may be allowed, thereby ensuring that the web page is not broken and that all of the features that a user expect to see on a web page are preserved and operational.

Modifications, additions, or omissions may be made to the privacy application 200 without departing from the scope of the present disclosure. For example, the privacy application 200 may include additional components similar to the components illustrated in FIG. 2 that each may be configured similarly to the components illustrated in FIG. 2. Further, in some embodiments, the functionality of the privacy application 200 may be spread across two or more separate privacy applications, such as where the function of the determination module 204 is performed on a first privacy application and the functions of the classifying module 206 and the blocking module 208 are performed on a second privacy application.

Figure 3:
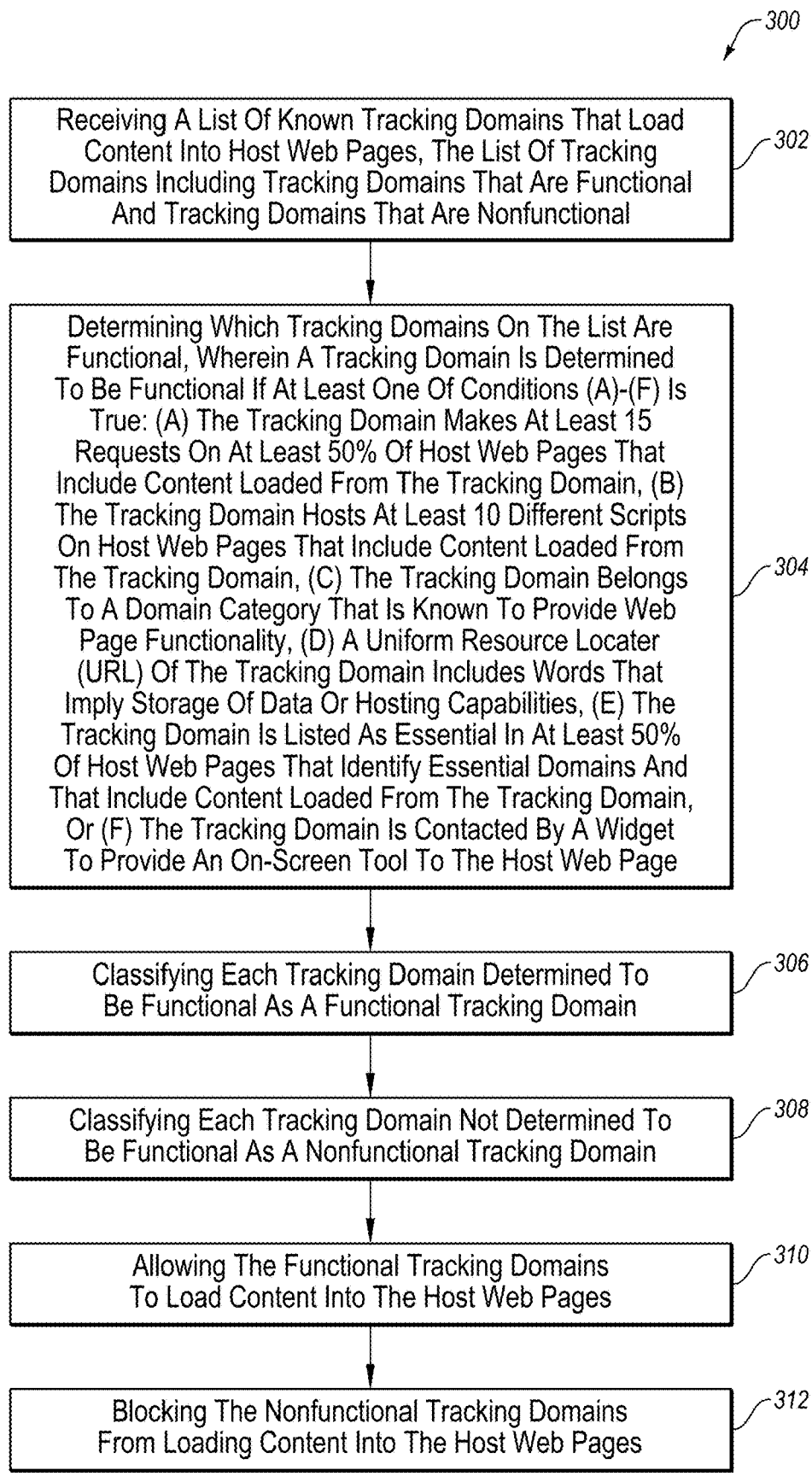
FIG. 3 is a flowchart of an example method for distinguishing between functional tracking domains and nonfunctional tracking domains on a host web page.

FIG. 3 is a flowchart of an example method 300 for distinguishing between functional tracking domains and nonfunctional tracking domains on a host web page. The method 300 may be performed, in some embodiments, by a device or system, such as by the privacy application 122 of FIG. 1 or the privacy application 200 of FIG. 2. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, receiving a list of known tracking domains that load content into host web pages, the list of tracking domains including tracking domains that are functional and tracking domains that are nonfunctional. For example, this list may be received from a database.

The method 300 may include, at action 304, determining which tracking domains on the list are functional, wherein a tracking domain may be determined to be functional if at least one of conditions (a)-(f) is true: (a) the tracking domain makes at least 15 requests on at least 50% of host web pages that include content loaded from the tracking domain, (b) the tracking domain hosts at least 10 different scripts on host web pages that include content loaded from the tracking domain, (c) the tracking domain belongs to a domain category that is known to provide web page functionality, (d) a uniform resource locater (URL) of the tracking domain includes words that imply storage of data or hosting capabilities, (e) the tracking domain is listed as essential in at least 50% of host web pages that identify essential domains and that include content loaded from the tracking domain, or (f) the tracking domain is contacted by a widget to provide an on-screen tool to the host web page. Each of these conditions will be discussed in turn.

To determine whether a tracking domain makes at least 15 requests on at least 50% of host web pages that include content loaded from the tracking domain as recited in condition (a), a request counter such as the request counter 210 shown in FIG. 2 may be used. While condition (a) requires at least 15 requests on at least 50% of host web pages, it is to be understood that any number of requests on any percentage of host web pages may be required. For example, in another embodiment, this condition may require a tracking domain to make more than 15 requests, such as at least 20 or 100 or more requests on at least 60% or more of host web pages that include content loaded from the tracking domain. Alternatively, in another embodiment, this condition may require a tracking domain to make fewer than 15 requests on less than 50% of host web pages that include content loaded from the tracking domain.

To determine whether a tracking domain hosts at least 10 different scripts as recited in condition (b), a script counter such as the script counter 212 shown in FIG. 2 may be used. While condition (b) requires at least 10 different scripts, it is to be understood that any number of different scripts may be required. For example, a tracking domain that hosts at least 20 or 30 or more different scripts may be required. Alternatively, a tracking domain that hosts fewer than 10 different scripts may be required.

To determine whether a tracking domain belongs to a domain category that is known to provide web page functionality as recited in condition (c), a category comparator such as the category comparator 214 shown in FIG. 2 may be used. To determine the domain category to which a tracking domain belongs, the category comparator may analyze the tracking domain and/or a website that is associated with the tracking domain. The category comparator may then compare the tracking domain category to a list of categories that are known to provide some web page functionality. This list of categories that are known to provide some web page functionality may also be stored on a database, such as database 202 of FIG. 2. The list of categories that are known to provide some web page functionality may include financial services, a dynamic DNS host, shopping, TV/video streams, social networking, auctions, audio/video clips, newsgroup/forums, chat (IM)/SMS, radio/audio streams, file storage/sharing, or email, to name a few. In one embodiment, in order for this condition to be determined to be true, a tracking domain may be required to belong to one of the above identified categories or another domain category that is known to provide some web page functionality to host web pages.

To determine whether a uniform resource locater (URL) of the tracking domain includes words that imply storage of data or hosting capabilities as recited in condition (d), a URL evaluator such as the URL evaluator 216 shown in FIG. 2 may be used. For each tracking domain included on the list received in step 302, the URL evaluator may evaluate the terms used in the URL address. In one embodiment, in order for this condition to be determined to be true, terms used in the URL address may be required to imply storage of data or hosting capacity. For example, the terms "CDN" or "asset" or another term may imply storage of data or hosting capacity.

To determine whether a tracking domain is listed as essential in at least 50% of host web pages that identify essential domains and that include content loaded from the tracking domain as recited in condition (e), an essential domain evaluator such as the essential domain evaluator 218 shown in FIG. 2 may be used. While condition (e) requires at least 50% of host web pages that identify essential domains and that include content loaded from the tracking domain, it is to be understood that any number of different percentages may be required. For example, in another embodiment, this condition may require a tracking domain to be listed as essential in at least 60% or 70% or more of host web pages that identify essential domains and that include content loaded from the tracking domain. Alternatively, in another embodiment, this condition may require a tracking domain to be listed as essential in less than 50% of host web pages that identify essential domains and that include content loaded from the tracking domain.

To determine whether a tracking domain is contacted by a widget to provide an on-screen tool to the host web page as recited in condition (f), a widget evaluator such as the widget evaluator 220 shown in FIG. 2 may be used. For each tracking domain included on the list received in step 302, the widget evaluator may evaluate web widgets that are embedded in host web pages. For example, a web widget may provide a search function, a chat function, a clock, a daily weather report, or a counter of visits on a web page, to name a few. Some web widgets contact external domains to provide the functionality enabled by the web widget. For example, a tracking domain may be contacted to provide an internal site search or chat functionality to a host web page. To identify the tracking domains that provide the functionality enabled by these web widgets, the widget evaluator may test the functionality of the web widget to confirm that it operates as a user would expect. For example, with regard to a web widget that provides an internal search functionality, the widget evaluator may enter specific query parameters (such as "q" or "query") with a dummy query string (or parts of it) as the value. The widget evaluator may determine whether URL parameter values contain substrings of "DUMMYSTRING", such as q=D or q=DU. If these URL parameter values contain these substrings, actual third-party search engine providers may be identified, and the functionality provided by the tracking domain may be confirmed.

The method 300 may include, at action 306, classifying each tracking domain determined to be functional as a functional tracking domain. In some embodiments, this determination may require a single condition recited in (a)—(f) to be true in order for a tracking domain to be classified as a functional tracking domain. In other embodiments, two or three or more of the condition recited in (a)—(f) may be required to be true in order for a tracking domain to be classified as a functional tracking domain.

The method 300 may include, at action 308, classifying each tracking domain not determined to be functional as a nonfunctional tracking domain. The method 300 may include, at action 310, allowing the functional tracking domains to load content into the host web pages and the method 300 may include, at action 312, blocking the nonfunctional tracking domains from loading content into the host web pages. The functional tracking domain may be allowed, and the nonfunctional tracking domains may be blocked by an extension or a plugin or an addon to a web browser or a web application, such as enforcement application 118 of FIG. 1 or the enforcement application 222 of FIG. 2.

The method 300 may thus be employed, in some embodiments, to distinguish between functional tracking domains and nonfunctional tracking domains. By distinguishing between these tracking domains, the tracking domains that have a unique purpose of tracking a user's online movements may be avoided and the tracking domains that provide web site functionality may be retained so that web pages function as expected.

Although the actions of the method 300 are illustrated in FIG. 3 as discrete actions, various actions may be divided into additional actions, combined into fewer actions, reordered, expanded, or eliminated, depending on the desired implementation. For example, in some embodiments, a portion of step 304 may be skipped. Once a tracking domain has been determined to be a functional tracking domain, any remaining conditions need not be analyzed. For example, in one embodiment, where only a single condition is required to be true in order to determine that a tracking domain is a functional tracking domain, once a single condition (such as condition (a)) is found to be true, whether any remaining conditions (such as conditions (b)-(e)) need not be determined and this portion of step 304 may be skipped.

Further, it is understood that the method 300 may also improve the functioning of a computer system itself. For example, allowing functional tracking domains to load content into host web pages will ensure that the host web pages function as expected. In addition, the functioning of host web pages may be improved by blocking tracking domains that do not provide any functionality to the web page. By blocking these tracking domains, content from these tracking domains will not be loaded onto the host web page and the web page will load approved content more quickly. Also, the method 300 may improve the technical field of online privacy protection. By blocking nonfunctional tracking domains, the tracking activities of these domains may be avoided, and a user's online privacy may be protected.

FIG. 4 illustrates an example computer system 400 that may be employed in distinguishing between functional tracking domains and nonfunctional tracking domains on a host web page. In some embodiments, the computer system 400 may be part of any of the systems or devices described in this disclosure. For example, the computer system 400 may be part of any of the user device 104, the privacy server 106, the host servers 108*a*-108*n*, the nonfunctional tracking server 110, and the functional tracking server 112 of FIG. 1 and the privacy application 200 of FIG. 2.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the web application 116, the enforcement application 118, and the privacy application 122 of FIG. 1 and the privacy application 200 of FIG. 2, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the web application 116, the enforcement application 118, and the privacy application 122 of FIG. 1 and the privacy application 200 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A computer-implemented method for distinguishing between functional tracking domains and nonfunctional tracking domains on a host web page, at least a portion of the method being performed by a computing device comprising one or more processors, the computer-implemented method comprising:
   receiving a list of known tracking domains that load content into host web pages, the list of tracking domains including tracking domains that are functional and tracking domains that are nonfunctional;
   determining which tracking domains on the list are functional, wherein a tracking domain is determined to be functional if at least one of conditions (a)-(f) is true:
   (a) the tracking domain makes at least 15 requests on at least 50% of host web pages that include content loaded from the tracking domain,
   (b) the tracking domain hosts at least 10 different scripts on host web pages that include content loaded from the tracking domain,
   (c) the tracking domain belongs to a domain category that is known to provide web page functionality,
   (d) a uniform resource locater (URL) of the tracking domain includes words that imply storage of data or hosting capabilities,
   (e) the tracking domain is listed as essential in at least 50% of host web pages that identify essential domains and that include content loaded from the tracking domain, or
   (f) the tracking domain is contacted by a widget to provide an on-screen tool to the host web page,
   classifying each tracking domain determined to be functional as a functional tracking domain;
   classifying each tracking domain not determined to be functional as a nonfunctional tracking domain; and
   allowing the functional tracking domains to load content into the host web pages and blocking the nonfunctional tracking domains from loading content into the host web pages.

2. The method of claim 1, wherein the functional tracking domains load a media reference into the host web page.

3. The method of claim 1, wherein to determine whether scripts are different, a fuzzy hashing function is used.

4. The method of claim 1, wherein the domain category that is known to provide web page functionality is financial services, dynamic DNS host, shopping, TV/video streams, social networking, auctions, audio/video clips, newsgroups/forums, chat (IM)/SMS, radio/audio streams, file storage/sharing, or email.

5. The method of claim 1, wherein the words that imply storage of data or hosting capabilities include "CDN," "asset," or "content".

6. The method of claim 1, wherein the host web pages identify essential domains in a privacy policy, a cookie policy, or a consent management provider.

7. The method of claim 1, wherein the tracking domain is determined to be functional if at least two of conditions (a)-(f) are true.

8. One or more non-transitory computer-readable media comprising one or more computer-readable instructions that, when executed by one or more processors of a privacy server, cause the privacy server to perform a method for distinguishing between functional tracking domains and nonfunctional tracking domains on a host web page, the method comprising:
receiving a list of known tracking domains that load content into host web pages, the list of tracking domains including tracking domains that are functional and tracking domains that are nonfunctional;
determining which tracking domains on the list are functional, wherein a tracking domain is determined to be functional if at least one of conditions (a)-(f) is true:
  (a) the tracking domain makes at least 15 requests on at least 50% of host web pages that include content loaded from the tracking domain,
  (b) the tracking domain hosts at least 10 different scripts on host web pages that include content loaded from the tracking domain,
  (c) the tracking domain belongs to a domain category that is known to provide web page functionality,
  (d) a uniform resource locater (URL) of the tracking domain includes words that imply storage of data or hosting capabilities,
  (e) the tracking domain is listed as essential in at least 50% of host web pages that identify essential domains and that include content loaded from the tracking domain, or
  (f) the tracking domain is contacted by a widget to provide an on-screen tool to the host web page,
classifying each tracking domain determined to be functional as a functional tracking domain;
classifying each tracking domain not determined to be functional as a nonfunctional tracking domain; and
allowing the functional tracking domains to load content into the host web pages and blocking the nonfunctional tracking domains from loading content into the host web pages.

9. The one or more non-transitory computer-readable media of claim 8, wherein the functional tracking domains load a media reference into the host web page.

10. The one or more non-transitory computer-readable media of claim 8, wherein to determine whether scripts are different, a fuzzy hashing function is used.

11. The one or more non-transitory computer-readable media of claim 8, wherein the domain category that is known to provide web page functionality is financial services, dynamic DNS host, shopping, TV/video streams, social networking, auctions, audio/video clips, newsgroups/forums, chat (IM)/SMS, radio/audio streams, file storage/sharing, or email.

12. The one or more non-transitory computer-readable media of claim 8, wherein the words that imply storage of data or hosting capabilities include "CDN," "asset," or "content".

13. The one or more non-transitory computer-readable media of claim 8, wherein the host web pages identify essential domains in a privacy policy, a cookie policy, or a consent management provider.

14. The one or more non-transitory computer-readable media of claim 8, wherein the tracking domain is determined to be functional if at least two of conditions (a)-(f) are true.

15. A computing device comprising:
one or more processors; and
one or more non-transitory computer-readable media comprising one or more computer-readable instructions that, when executed by the one or more processors, cause the computing device to perform a method for distinguishing between functional tracking domains and nonfunctional tracking domains on a host web page, the method comprising:
receiving a list of known tracking domains that load content into host web pages, the list of tracking domains including tracking domains that are functional and tracking domains that are nonfunctional;
determining which tracking domains on the list are functional, wherein a tracking domain is determined to be functional if at least one of conditions (a)-(f) is true:
  (a) the tracking domain makes at least 15 requests on at least 50% of host web pages that include content loaded from the tracking domain,
  (b) the tracking domain hosts at least 10 different scripts on host web pages that include content loaded from the tracking domain,
  (c) the tracking domain belongs to a domain category that is known to provide web page functionality,
  (d) a uniform resource locater (URL) of the tracking domain includes words that imply storage of data or hosting capabilities,
  (e) the tracking domain is listed as essential in at least 50% of host web pages that identify essential domains and that include content loaded from the tracking domain, or
  (f) the tracking domain is contacted by a widget to provide an on-screen tool to the host web page,
classifying each tracking domain determined to be functional as a functional tracking domain;
classifying each tracking domain not determined to be functional as a nonfunctional tracking domain; and
allowing the functional tracking domains to load content into the host web pages and blocking the nonfunctional tracking domains from loading content into the host web pages.

16. The computing device of claim 15, wherein the functional tracking domains load a media reference into the host web page.

17. The computing device of claim 15, wherein to determine whether scripts are different, a fuzzy hashing function is used.

18. The computing device of claim 15, wherein the domain category that is known to provide web page functionality is financial services, dynamic DNS host, shopping, TV/video streams, social networking, auctions, audio/video clips, newsgroups/forums, chat (IM)/SMS, radio/audio streams, file storage/sharing, or email.

19. The computing device of claim 15, wherein the words that imply storage of data or hosting capabilities include "CDN," "asset," or "content".

20. The computing device of claim 15, wherein the host web pages identify essential domains in a privacy policy, a cookie policy, or a consent management provider.

* * * * *